(12) United States Patent
Jackson et al.

(10) Patent No.: US 10,556,300 B2
(45) Date of Patent: Feb. 11, 2020

(54) AUTOMATED PLASMA CUTTING APPARATUS AND SYSTEM

(71) Applicant: ILLINOIS TOOL WORKS INC., Glenview, IL (US)

(72) Inventors: Harrison J. Jackson, Baltimore, MD (US); Eric D. Guy, Ellicott City, MD (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 230 days.

(21) Appl. No.: 15/658,805

(22) Filed: Jul. 25, 2017

(65) Prior Publication Data
US 2018/0029171 A1 Feb. 1, 2018

Related U.S. Application Data

(60) Provisional application No. 62/368,249, filed on Jul. 29, 2016.

(51) Int. Cl.
*B23K 10/00* (2006.01)
*B23K 37/02* (2006.01)
*B23K 37/04* (2006.01)

(52) U.S. Cl.
CPC .......... *B23K 37/0235* (2013.01); *B23K 10/00* (2013.01); *B23K 10/006* (2013.01);
(Continued)

(58) Field of Classification Search
CPC .. B23K 37/0235; B23K 10/00; B23K 10/006; B23K 37/0258; B23K 37/0288; B23K 37/0408; H05H 1/26; H05H 1/36
(Continued)

(56) References Cited

U.S. PATENT DOCUMENTS 4,692,582 A * 9/1987 Marhic .................... H05H 1/36
219/121.48
4,914,271 A * 4/1990 Delzenne ............... B23K 9/296
219/121.48
(Continued)

FOREIGN PATENT DOCUMENTS

JP S6046868 3/1985
JP H0577051 3/1993
(Continued)

OTHER PUBLICATIONS

PCT, International Search Report and Written Opinion, International Application No. PCT/US2017/043600; dated Nov. 7, 2017, 14 pages.

*Primary Examiner* — Mark H Paschall
(74) *Attorney, Agent, or Firm* — Thompson Hine LLP (57) ABSTRACT

A plasma cutting apparatus includes a housing, a workpiece support, a movable plasma nozzle, and a nozzle drive arrangement. The housing includes a base, an upright pedestal extending upward from the base, and a stationary head cantilevered from the upright pedestal. The workpiece support extends from the upright pedestal and is located below the stationary head. The nozzle extends downward from an underside of the stationary head and is oriented for delivering a cutting plasma generally along one direction and toward a workpiece on the workpiece support. The nozzle drive arrangement is mounted to the stationary head and is connected for moving the plasma nozzle during a cutting operation.

17 Claims, 9 Drawing Sheets

(52) U.S. Cl.
CPC ...... *B23K 37/0258* (2013.01); *B23K 37/0288* (2013.01); *B23K 37/0408* (2013.01)

(58) Field of Classification Search
USPC .............. 219/121.39, 121.59, 121.48, 121.5, 219/121.52, 121.56, 121.58
See application file for complete search history.

(56) References Cited

U.S. PATENT DOCUMENTS

| | | | |
|---|---|---|---|
| 5,844,196 A | 12/1998 | Oakley | |
| 6,359,251 B1 | 3/2002 | Picard et al. | |
| 6,486,438 B1* | 11/2002 | Esslinger | B23K 9/048 219/125.11 |
| 6,745,454 B1 | 6/2004 | Grimshaw | |
| 7,022,935 B1* | 4/2006 | Matus | B23K 10/00 219/121.39 |
| 7,709,765 B2 | 5/2010 | Picard et al. | |
| 8,350,182 B2* | 1/2013 | Shipulski | B23K 10/02 219/121.39 |
| 8,395,074 B2 | 3/2013 | Winn et al. | |
| 8,969,754 B2* | 3/2015 | Luce | B05B 7/222 175/331 |
| 9,446,472 B2 | 9/2016 | Winn et al. | |
| 2004/0226921 A1* | 11/2004 | Picard | B23K 10/006 219/121.55 |
| 2005/0035093 A1 | 2/2005 | Yamaguchi | |
| 2005/0077271 A1 | 4/2005 | Delzenne | |
| 2007/0241083 A1 | 10/2007 | Yamaguchi | |
| 2009/0312862 A1* | 12/2009 | Fagan | B23K 10/006 700/160 |
| 2010/0301020 A1* | 12/2010 | Phillip | B23K 10/00 219/121.44 |
| 2012/0037274 A1 | 2/2012 | Henderson | |
| 2013/0098884 A1 | 4/2013 | Shipulski et al. | |
| 2014/0061170 A1 | 3/2014 | Lindsay et al. | |
| 2015/0127137 A1 | 5/2015 | Brandt | |
| 2015/0231724 A1 | 8/2015 | Williams | |
| 2015/0239059 A1 | 8/2015 | Myers | |
| 2015/0273618 A1* | 10/2015 | Harkare | B23K 10/00 219/121.39 |

FOREIGN PATENT DOCUMENTS

| | | |
|---|---|---|
| JP | H11226743 | 8/1999 |
| JP | 2013 119101 | 6/2013 |
| WO | WO 01/96057 | 12/2001 |

\* cited by examiner

AUTOMATED PLASMA CUTTING APPARATUS AND SYSTEM

CROSS-REFERENCE TO RELATED APPLICATION

This application claims priority to U.S. Provisional Application No. 62/368,249, filed Jul. 29, 2016, the entire contents of which are incorporated herein by reference.

TECHNICAL FIELD

This application relates generally to cutting machines for cutting metal and, more particularly, to a plasma cutting machine that is well suited for use in the shop environment and portable to job sites.

BACKGROUND

Typical production plasma cutters are designed for large-scale, industrial applications where designs are not repeatedly altered. Most compact plasma cutting tables are essentially miniature versions of the production ones, with many of the same drawbacks, which include being generally limited to cutting flat (generally un-bent) parts and not being easily adaptable to make variations in cuts and/or parts cut.

Typical production plasma cutters employ gantry systems that enclose the material sheet. Known cantilever setups generally translate in one cut direction only with the material that is being processed, generally tubing, continually passed under the cantilever nozzle. A standalone, cantilevered setup is desired where the workpiece does not move and the relative position of the cutter is completely controlled by an overhead drive arrangement.

The only known uses of plasma delivery are thru either manual hand-operated torches or machine torches equipped for installation into third-party CNC tables and machines. Both styles include a nozzle body receiving typical plasma wear consumables such as, but not limited to, tips, electrodes, and swirl rings. The torches are also permanently assembled with a bulk length of cable generally containing the necessary gas hose, voltage wire, and feedback wire. These torch configurations make implementation into a compact cutting apparatus cumbersome, expensive, and drivers of increased space envelopes for operation.

Alternative shape cutting machines for metal include punch presses and ironworkers. These machines require the use of die sets for corresponding shapes, and as such as are not suited for the evolving needs of custom computer-designed profiles beyond singular round holes. These machines are also bulky with limited material thickness capabilities based on hydraulic tonnage. The lowest power plasma supply generators that are commercially available easily exceed these typical thickness limitations.

It would be desirable to provide a simple, compact cutting apparatus adapted to the needs of the typical shop environment and portable to job sites. A flexible, on-demand plasma cutting machine is desired suitable for a multi-user, multi-material environment.

SUMMARY

In one aspect, a plasma cutting apparatus includes a housing, a workpiece support, a movable plasma nozzle, and a nozzle drive arrangement. The housing includes a base, an upright pedestal extending upward from the base, and a stationary head cantilevered from the upright pedestal. The workpiece support extends from the upright pedestal and is located below the stationary head. The nozzle extends downward from an underside of the stationary head and is oriented for delivering a cutting plasma generally along one direction and toward a workpiece on the workpiece support. The nozzle drive arrangement is mounted to the stationary head and is connected for moving the plasma nozzle during a cutting operation.

In one implementation, the plasma cutting apparatus includes a controller within the housing and connected to the nozzle drive arrangement and plasma nozzle.

In one implementation, the plasma cutting apparatus further includes a user interface on the housing.

In one implementation, the plasma cutting apparatus permits user selection of a circular cut pattern from the pre-programmed controller and cutting the circle from a metal workpiece.

In another implementation, the plasma cutting apparatus further includes a plasma supply gas and voltage delivery network completely within the housing and plasma nozzle running from the fixed plasma input port set to the plasma nozzle.

In one implementation, a height of the workpiece support along the pedestal is adjustable.

In one implementation, the plasma cutting apparatus further includes an alignment mechanism.

In one implementation, a footprint of the cantilevered head and a footprint of the base are substantially the same.

In another aspect, an automated plasma cutting system includes an automated plasma cutting apparatus, a plasma arc power generator, and an external harness of wire and hose directly connecting and communicating between the plasma cutting apparatus and the plasma arc power generator.

By implementing the nozzle body directly into the cutting apparatus, plasma supply gas, voltage, and feedback can be transmitted thru a more compact, flexible, and lower cost network of hose and wire. This can further eliminate undue mechanical stress on the hose and wire as well as on the nozzle drive components.

The details of one or more embodiments are set forth in the accompanying drawings and the description below. Other features, objects, and advantages will be apparent from the description and drawings, and from the claims.

DETAILED DESCRIPTION

Referring to FIGS. 1-8C, plasma cutting apparatus 10 includes a housing 12, a workpiece support 14, a movable plasma nozzle 16, and a nozzle drive arrangement 15. The housing 12 includes a base 18, an upright pedestal 20 extending upward from the base, and a stationary head 22 cantilevered from the upright pedestal 20. The workpiece support 14 extends from the upright pedestal 20 and is located below the stationary head 22. The nozzle 16 extends downward from an underside of the stationary head 22 and is oriented for delivering a cutting plasma generally along one direction (e.g. here vertically downward) and toward a workpiece 101 on the workpiece support 14.

Figure 5:
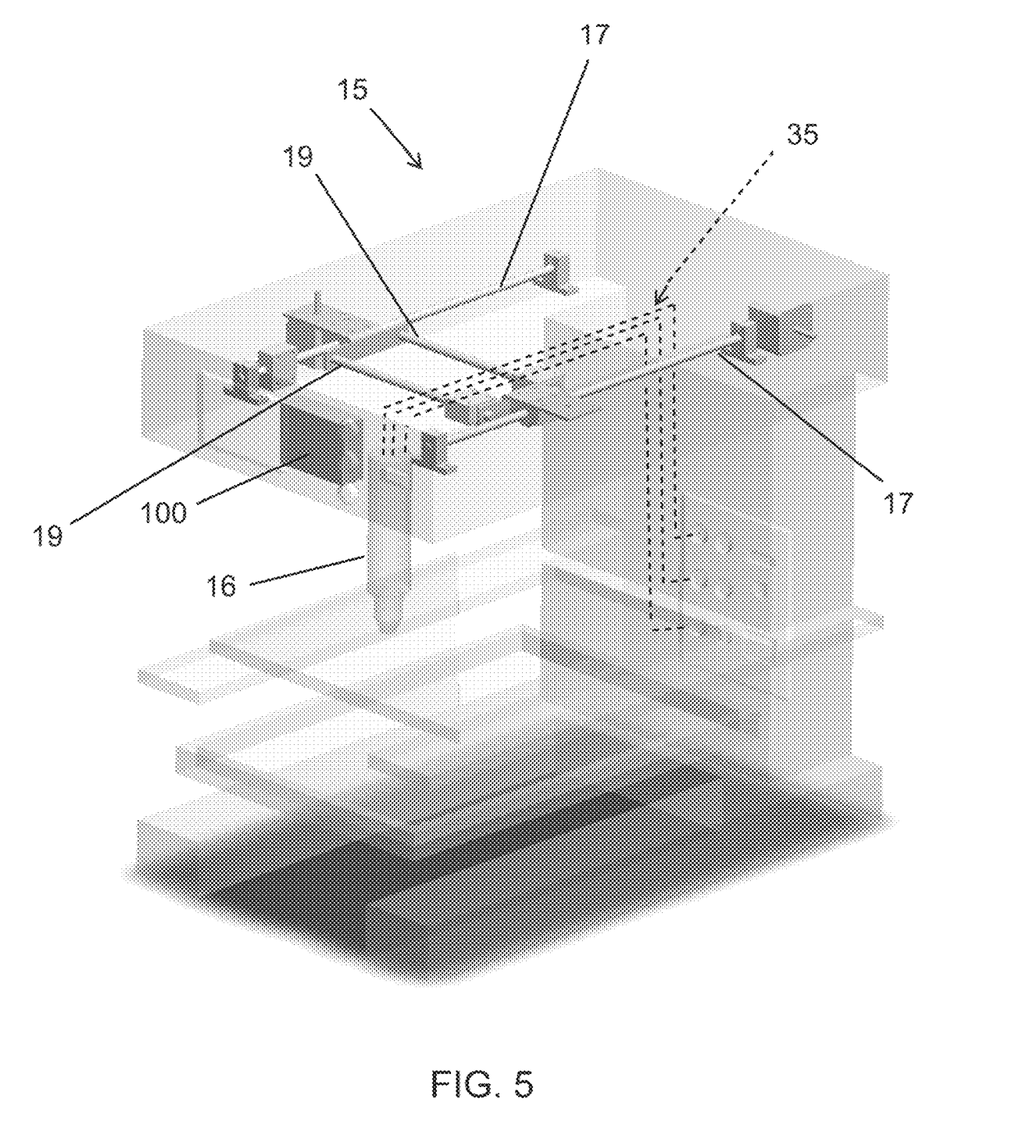
FIG. 5 is front transparent view of the plasma cutting apparatus shown in FIG. 1 showing some internal components.

The nozzle drive arrangement 15 is mounted to the stationary head 22 and is connected for moving the plasma nozzle 16 during a cutting operation. For example, the nozzles drive arrangement may be up with the head or suspended from the head, or a combination of both. As shown in FIG. 5, the nozzle drive arrangement may be completely enclosed within the head 22. The arrangement 15 may take the form of spaced apart rails or tracks 17 and a set of cross rails or tracks 19, where the nozzle 16 is mounted for side-to-side movement on the cross rails or tacks 19 (e.g., under control of a motor, such as a stepper motor, or a linear actuator) and where the cross-rail or tack 19 is mounted for front to back movement along the spaced apart rails or tracks 17 (e.g., under control of a motor, such as a stepper motor, or linear actuator). Movement of the plasma nozzle 16 may be in any direction on the plane of the workpiece support 14. Thus, if the workpiece support 14 is viewed as an X-Y plane, the nozzle drive arrangement 15 can position the plasma nozzle 16 at any coordinate of that X-Y plane.

The nozzle drive arrangement 15 may include means to automatically adjust the nozzle height relative to the workpiece during the cut operation. This is commonly known as torch height control (THC) and several examples are known, one method using voltage sensing feedback.

The height of the workpiece support 14 along the pedestal 20 is adjustable. In one embodiment this may be accomplished by simply ratcheting the support upward or downward thru one or more indexed notches or supports integral with the pedestal 20. In other embodiments a rack and pinion gear setup may be disposed within the housing 12 and manually actuated with an external knob or handle 24. Powered height adjustment (e.g., motor or linear actuator) is also possible.

The housing 12 may include removable cover panel or panels 25 associated with stationary head 22 that cover and protect housing 12 components during normal cutting operations but permits infrequent servicing or maintenance of the nozzle drive arrangement 15 and other machine components in the head.

Figure 1:
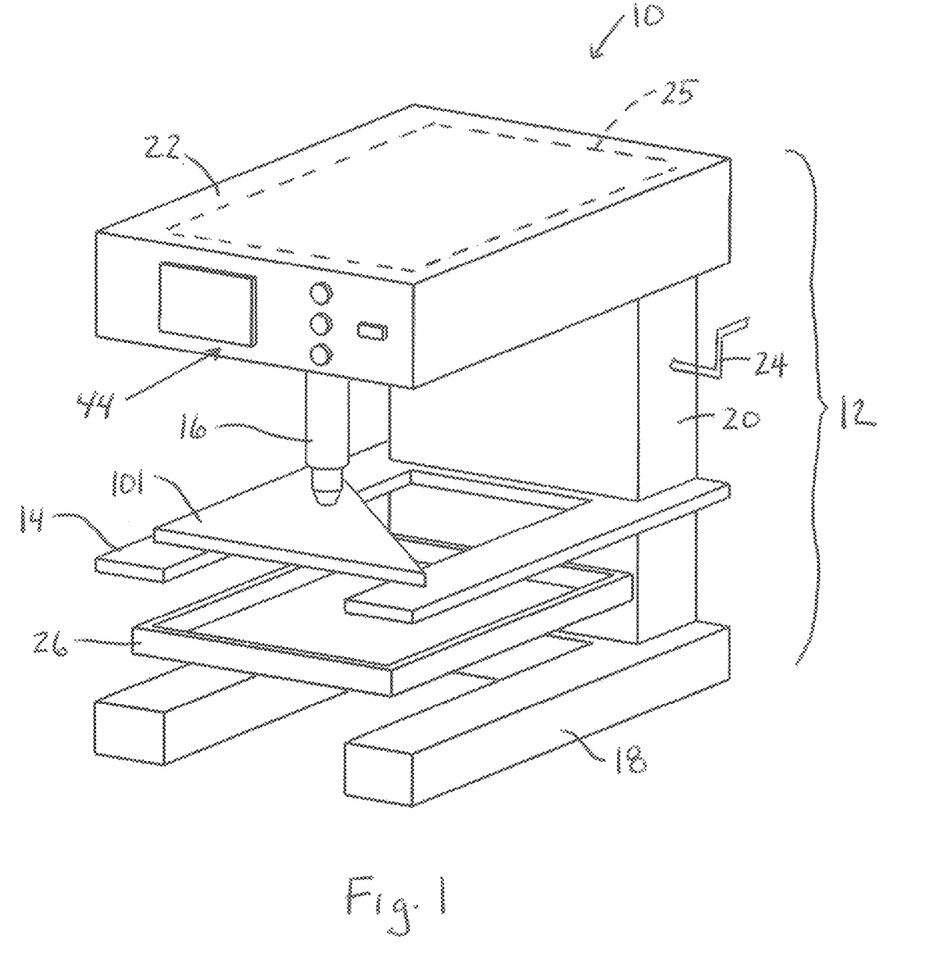
FIG. 1 is a schematic diagram of an exemplary plasma cutting apparatus.
Figure 2:
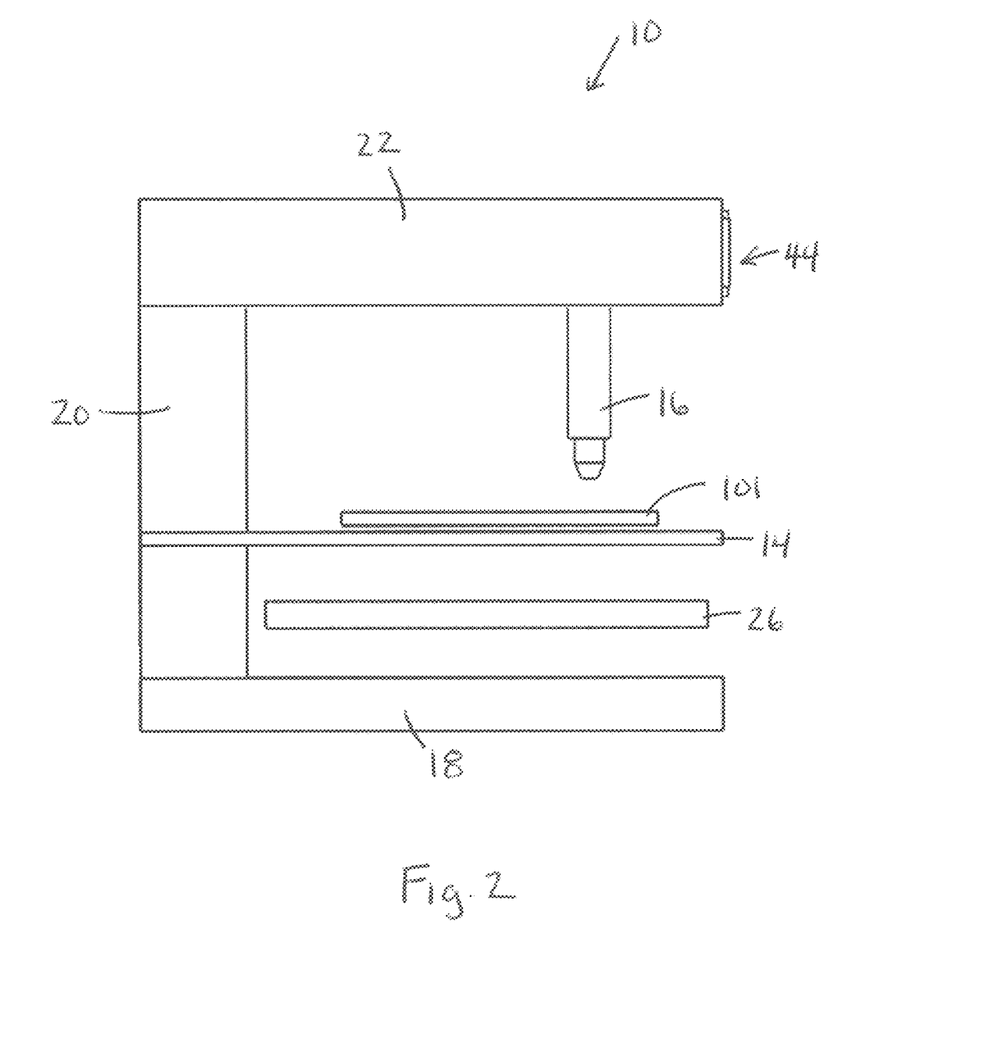
FIG. 2 is a side view of the plasma cutting apparatus shown in FIG. 1
Figure 7:
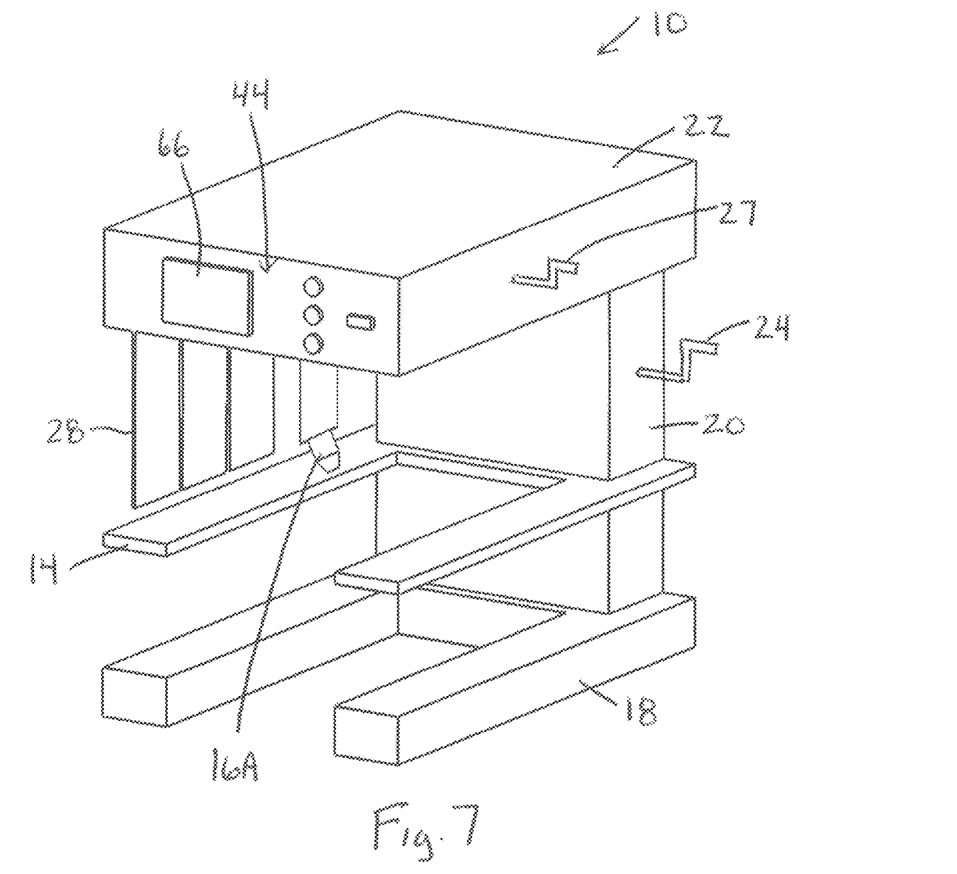
FIG. 7 is a front view of the plasma cutting apparatus shown in FIG. 1 displaying optional features.

As shown in FIG. 1, plasma cutting apparatus 10 may include a collection pan 26, which may collect cut parts or dust that have passed through openings in the workpiece support 14 and/or any cooling water used during the cutting process. The collection pan 26 may rest on the base 18, suspend from the workpiece support 14, or mount directly to the pedestal 20. As shown in FIG. 7 the collection pan 26 is removed.

As shown in FIG. 7, plasma shield 28 may be included at the underside of the stationary head 22 and may be disposed around the plasma nozzle 16 along at least front, left, and right side portions of the stationary head 22. In FIG. 7, a partial view of the shielding 28 is shown on the left side portion of the stationary head 22. This plasma shield 28 may be tinted so as to not only provide a physical shield around the plasma created for cutting but also an energy shield to help protect the user's eyes. The height of the plasma shield 28 may also be raised and lowered to facilitate aligning the plasma nozzle 16 before cutting and for accessing the plasma nozzle 16 for repairing and/or replacing the plasma nozzle 16. Height adjustment may be accomplished by handle 27. Alternatively, height adjustment may be accomplished by a drive arrangement (e.g., motor or linear actuator) included within housing 12 for powered adjustment of the height of the plasma shield 28.

Figure 4:
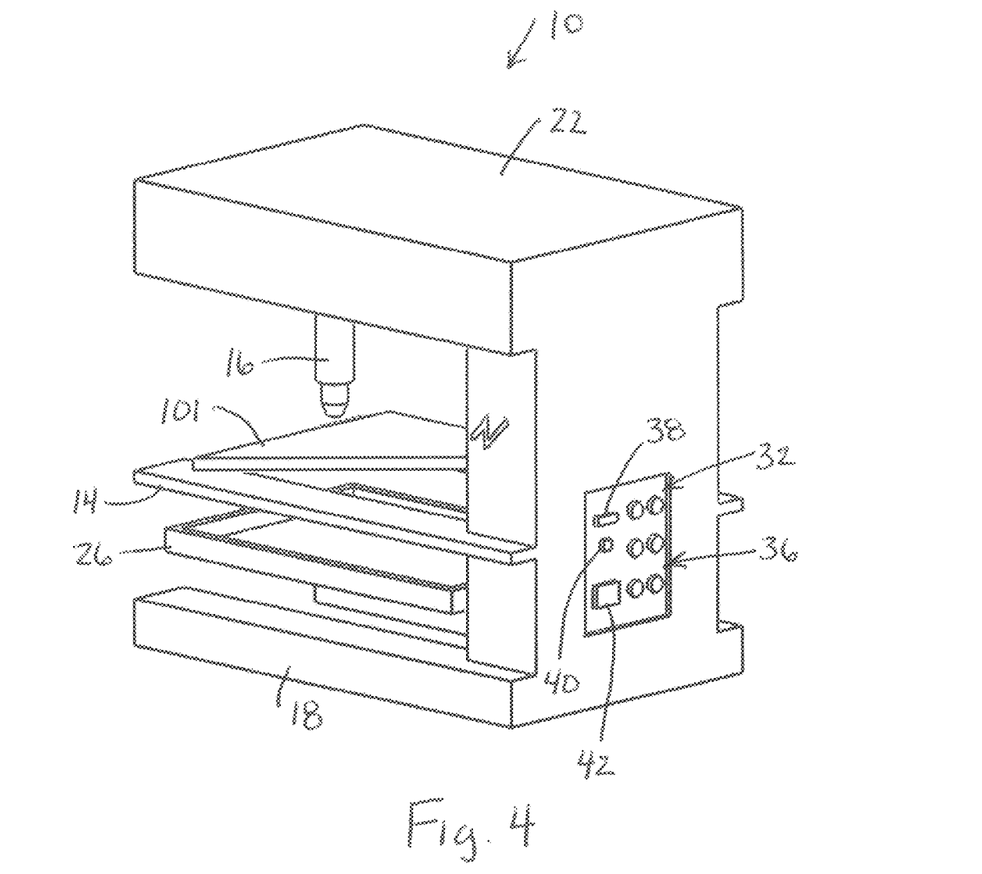
FIG. 4 is a rear view of the plasma cutting apparatus shown in FIG. 1.

As best shown in FIG. 4, pedestal 20 of housing 12 may include various ports for introducing plasma source gas, information, or power into the plasma cutting apparatus 10. These ports may be aggregated as one array or set 32. Exemplary ports include fixed couplers for each of plasma supply gas, voltage, grounding, and system feedback, collectively shown as port set 36. Additional ports may include universal serial bus ports 38 and fixed power inlet coupler 42. Conveniently, this port set 32 may be included on the rear of the plasma cutting apparatus 10.

Port set 36 provides an inlet for the plasma source gas, voltage, grounding, and system feedback as directly received from the plasma supply. Typical plasma supply outputs for gas and voltage are delivered in one cable to a nozzle, system feedback received in said cable from the nozzle and delivered to a standalone machine controller thru a separate communications cable (e.g. ethernet), and grounding thru a separate wire generally affixed on one end to a clamp. The cable, ethernet, and ground wire may or may not be detachable from the plasma supply. Receipt and communication of these inputs and signals at the cutting apparatus 10 is dependent on the specific output configurations of the plasma supply. Thus, an external harness 103 of hose and wiring is preferred to directly connect the plasma supply to the cutting apparatus 10 at port set 36.

As shown schematically in FIG. 5, a network 35 of hose and wiring for delivering plasma supply gas and voltage between port set 36 and the nozzle 16 may be included entirely within the housing 12 and nozzle 16. At least a portion of the network 35 in the head 22 may be flexible to facilitate the nozzle movement (e.g., as in a coiled tubular air hose).

Port set 36 may include a gas supply, voltage path, a ground path, and one or more status feedback paths. In this manner, a stand-alone plasma arc power generator 102 can be attached to the plasma cutting apparatus 10, and signals may be passed between the plasma cutting apparatus 10 and the plasma arc power generator 102 in a direction both from and back to the plasma arc power generator. Thus, using a system of feedback between the two units, an efficient amount of power may be used to generate the cutting plasma.

Multiple plasma supply ground paths may be made available. One preferred location for workpiece 101 grounding is thru the workpiece support 14. Alternately, a fixed ground path coupler 40 may be provided and used to directly ground the workpiece 101 using a detachable cable and clamp that connects to the coupler 40. Plasma operation is not possible without adequate workpiece grounding, hence providing extensive and redundant grounding paths throughout the cutting apparatus is desired.

Figure 6A:
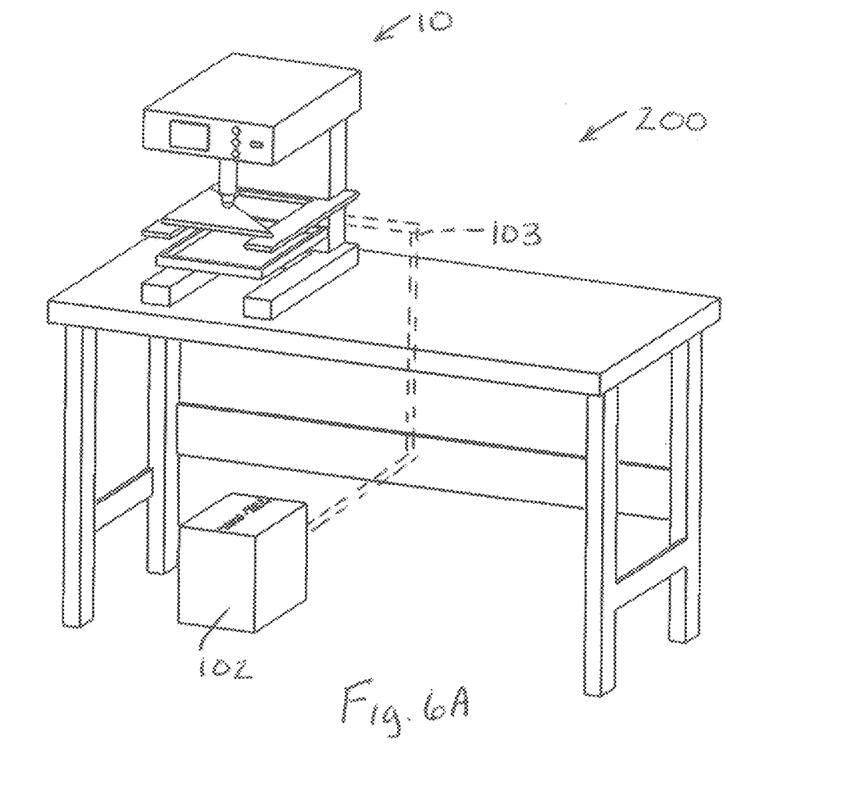
FIGS. 6A-6B are exemplary views of an automated plasma cutting system.
Figure 6B:
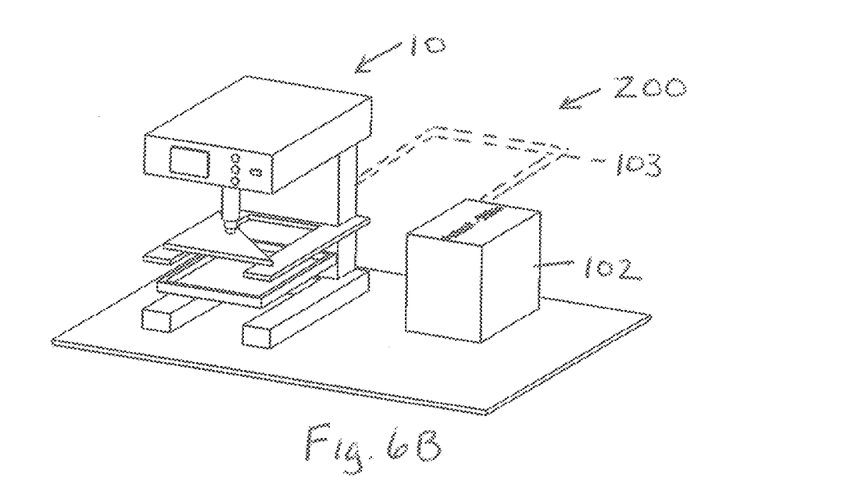

As shown in FIGS. 6A-6B, a complete automated plasma cutting system 200 includes an automated plasma cutting apparatus 10, a plasma arc power generator 102, and an external harness 103 of hose and wiring (schematically shown) for directly connecting and communicating between the plasma cutting apparatus and the plasma arc power generator. The external harness may include one or multiple wires, cables, or hoses depending on the number and types of outputs on the plasma arc power generator 102. The external harness 103 has no direct gas or voltage supply or communication means with the nozzle 16 except thru cutting apparatus 10 and port set 36. FIG. 6A shows a typical shop environment setup on a conventional workbench while FIG. 6B shows a floor arrangement.

Although the plasma cutting apparatus 10 may be pre-programmed with basic cutting shapes, as described more fully below, universal serial bus ports 38, 54 may be used to import programming for more complex cutting shapes. In addition, or alternatively, plasma cutting apparatus 10 may also include a wireless network radio for importing such programming.

Plasma cutting apparatus 10 may also include a user interface 44 on the housing 12. Conveniently, user interface 44 may be included on the front of plasma cutting apparatus 10, especially on head 22, and may be formed by a display 66, switches, buttons, knobs and/or data ports.

As shown in FIG. 5, plasma cutting apparatus 10 includes a controller 100 within the housing 12 and connected to control the nozzle drive arrangement 15 and plasma nozzle 16 to control plasma nozzle movement and plasma nozzle firing according to a specified cut pattern to be made in the workpiece 101. As used herein, the term controller is intended to broadly encompass any circuit (e.g., solid state, application specific integrated circuit (ASIC), an electronic circuit, a combinational logic circuit, a field programmable gate array (FPGA)), processor(s) (e.g., shared, dedicated, or group—including hardware or software that executes code), software, firmware and/or other components, or a combination of some or all of the above, that carries out the control functions of the machine or the control functions of any component thereof. The controller may also include locally-stored and accessible non-transitory memory, which incorporates, for example cut patterns (e.g. G-code). The cut patterns may or may not include variable parameters for ready user adjustment via the user interface.

Conveniently, the controller 100 may be configured to effect operation of the nozzle drive arrangement 15 to carry out an automatic homing operation of the plasma nozzle upon conclusion of a given cutting process. Additionally, the controller may be configured to automatically convert certain drawing formats to G-code for operation of the nozzle drive arrangement and plasma nozzle firing.

As best shown in FIG. 3 and FIGS. 8A-8C, user interface 44 may include multiple selectable standard cut shape inputs. Convenient standard cut shapes may include circles, rectangles (or squares), and lines (or slots). Circles allow for the introduction of holes and can allow the plasma cutting apparatus 10 to replace a standard drill press machine in manufacturing components with holes. The user interface 44 may also include size adjustment knob 48 to increase the radius of the standard cut circles, the side length of standard cut rectangles, and the length of standard cut lines. Additionally, user interface 44 may include nozzle speed input 50. Optional kerf position adjustment input 52 allows for the toggling of the kerf position, which may be convenient if the plasma cutting apparatus 10 is to be used for producing both cutouts, i.e., the piece removed from the workpiece is retained but the remaining workpiece is discarded, and holes, i.e., the workpiece is retained but the piece removed is discarded. Data input port 54, shown as a universal serial bus port in FIG. 3, may be used for receiving custom cut data, just as the universal serial bus ports 38, described above. Receipt of cut data flash memory of a universal serial bus and/or thru a wifi connection is possible. The user interface 44 may also include an illuminated start button 56 that may be lit with one color to indicate proper grounding and general readiness of the plasma cutting apparatus 10 and may be lit a different color to indicate the cut is in progress. For instance, the illuminated start button 56 may shine in a green color to indicate the apparatus is prepared for cutting and may shine in a red color to indicate the apparatus is performing a cut.

Figure 3:
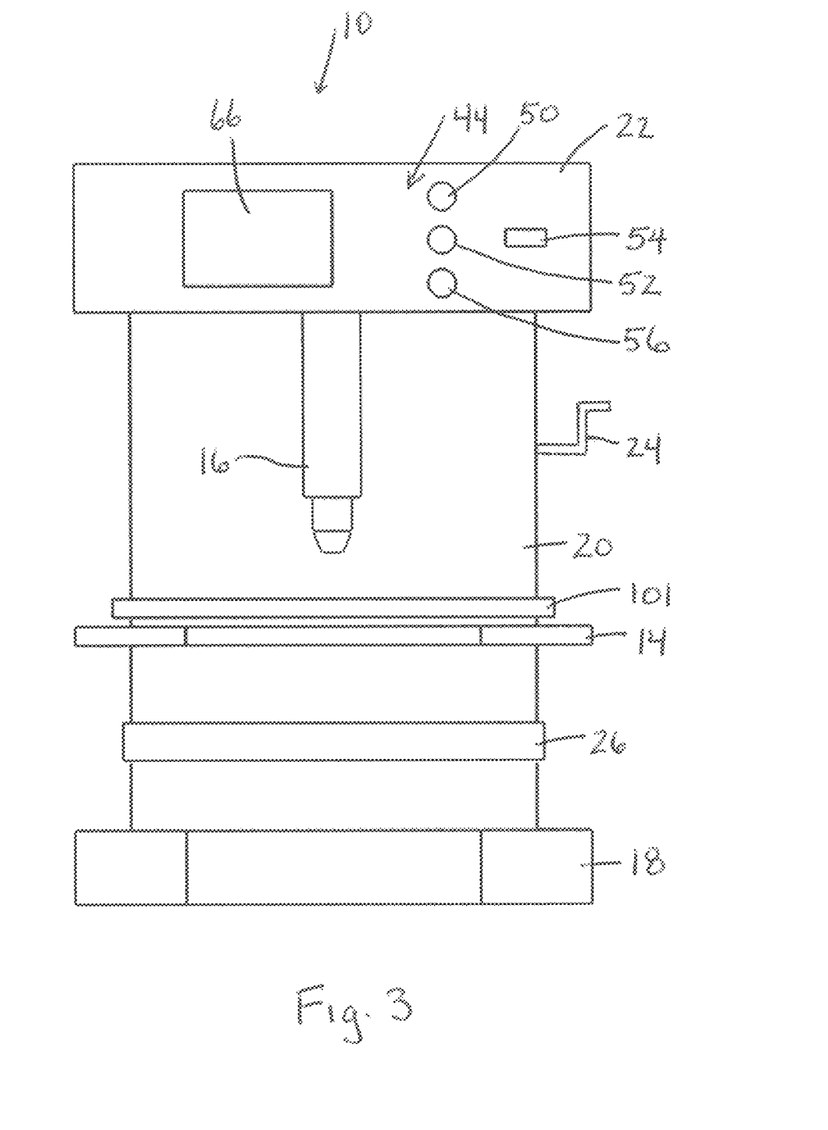
FIG. 3 is a front view of the plasma cutting apparatus shown in FIG. 1.
Figure 8A:
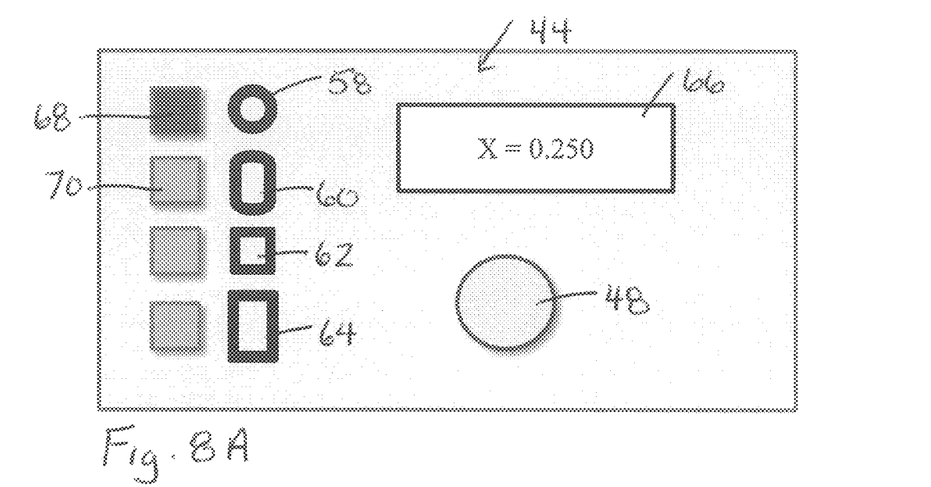
FIGS. 8A-8C are detail views of exemplary user interfaces for the plasma cutting apparatus.
Figure 8B:
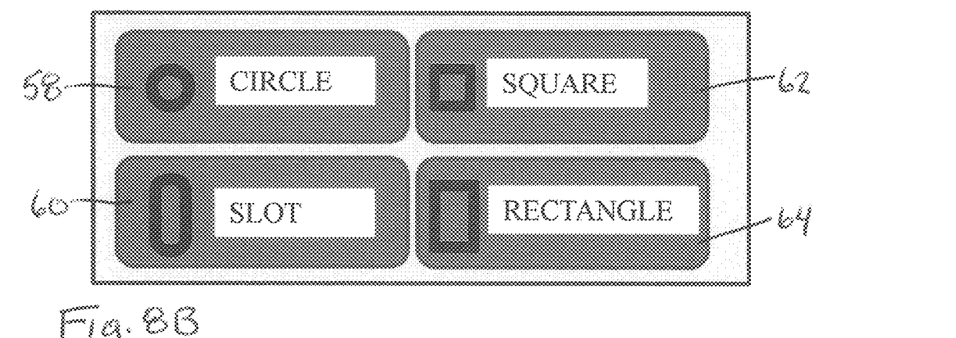
Figure 8C:
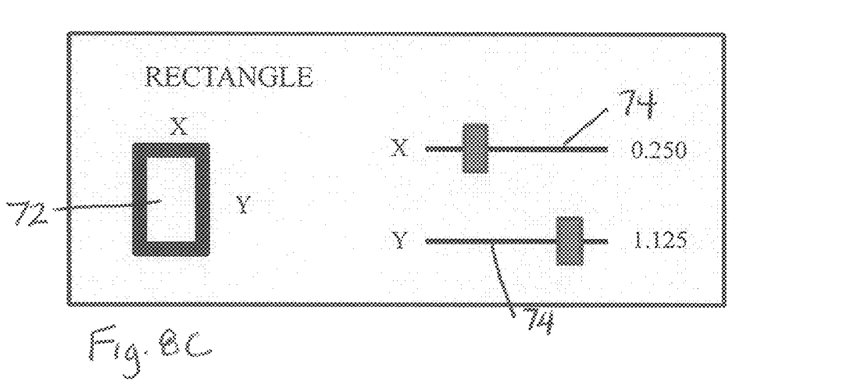

As shown in FIGS. 8A-8C, the user interface 44 may display various pre-programmed configurations. FIG. 8A shows a set of touchscreen selection controls that can be used to select the shape, e.g., circle 58, slot 60, square 62, and rectangle 64, of the cut. Size adjustment knob 48 may be may be an integral component of the touchscreen, as shown in FIG. 8A, but it may also be a stand-alone control, as shown in FIG. 3. The size is selected by rotating the knob until the appropriate dimension is displayed in display 66. For circle 58, the displayed value is the radius. For the slot 60, the displayed value is the length. For the square 62, the displayed value is the side length. For the rectangle 64, two values are displayed, one for each of the side lengths. Each standard cut shape may have an indicator light associated with it. In one example, the indicator light is shown as one color for the selected shape 68 and another color for the non-selected shapes 70.

FIG. 8B shows another option for the user interface 44. Here, touchscreen controls allow for the selection of one of the shapes and standalone controls are then used for controlling the size of these shapes, as shown in FIG. 8C. In FIG. 8C, the selected shape 72 is shown and size adjustment controls 74 are used to set relevant dimensions.

The starting position on the workpiece to be cut may be aligned using one of many alignment mechanisms. The simplest alignment mechanism may include a laser pointer aimed along the plasma nozzle 16 and down toward the workpiece 101. Alternatively, the entire outline of the intended cut may be projected onto the workpiece using conventional projection technology. As another alternative, a camera may be installed to view along the plasma nozzle 16, and the image displayed from that camera may include an overlay of the intended cut. Yet another alternative is to align lenses and mirrors to allow the user to operate the plasma cutting apparatus 10 from in front of the apparatus while viewing alignment marks built into the lens on the workpiece 101.

The plasma cutting apparatus 10 uses fixed power input coupler 42, shown in FIG. 4, as a means to connect normal source power (either 120V or 240V) from a typical wall-mounted receptacle to the plasma cutting apparatus 10.

Referring to FIG. 7, the angle of a segment 16A of the nozzle 16 relative to the workpiece support 14 may be adjustable to create bevel cuts in a workpiece (not shown). Other potential uses for angling the nozzle include offsetting known draft angles and visible striation patterns due to the cutting process.

A nozzle 16 comprises typical plasma wear consumables known in the art, such as, but not limited to, tips, electrodes, and swirls rings. A nozzle body can be defined as receiving plasma wear consumables.

In another embodiment, housing 12 may include a cutting mechanism, such as plasma nozzle 16, mounted to deliver a cutting plasma generally along one direction or dimension and to a workpiece 101 on the workpiece support 14. The housing may also contain a plasma source conduit network 35, a user interface 44, a controller 100, and a fixed port set 36 for receiving plasma supply gas, voltage, grounding, and system feedback. The plasma source conduit network 35 connects the cutting mechanism and the at least one fixed port set 36 and is completely enclosed within the housing and cutting mechanism during operation of the plasma cutting apparatus.

The relative position of the cutting plasma to the workpiece support 14 can be adjusted in two orthogonal directions of said one direction or dimension, without adjusting the relative positions between the workpiece support 14, pedestal 20, and top 22. Thus, the workpiece support 14 may remain stationary during cutting.

Typical machine torch feedback signals include OK-to-move and voltage sensing. These are typically transmitted from the nozzle to the plasma power supply then to a standalone motion controller. In the preferred embodiment, the feedback signals and motion controller are self-contained with the cutting apparatus.

In one embodiment, the area of the projected rectangular footprint of the head 22 may be at least 70% of the area of the projected rectangular footprint of the base and no more than 130% of the area of the projected rectangular footprint of the base. As used herein the area of the projected rectangular footprint refers to an area determined by multiplying a largest front to back to dimension (of the head or base) by the largest side to side dimension (of the head or base). In the illustrated embodiment, the area of the projected rectangular footprint of the head is substantially the same as the area of the projected rectangular footprint of the base.

Figure 9:
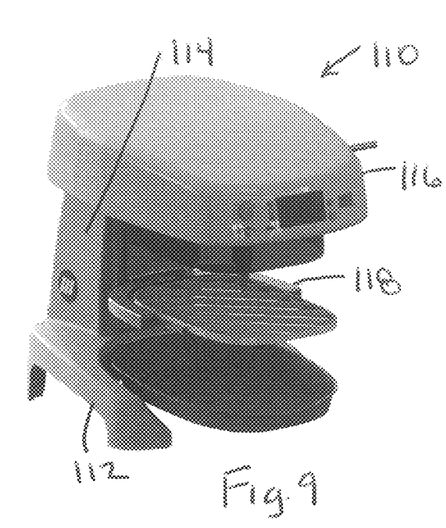
FIGS. 9-11 show another embodiment of a plasma cutting apparatus adapted for connection to a plasma arc source.
Figure 10:
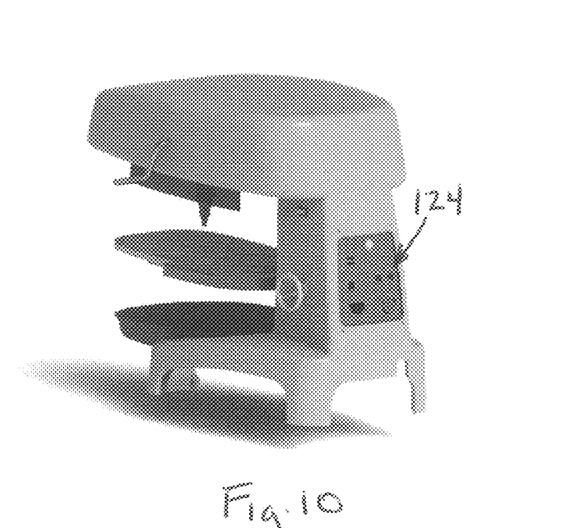
Figure 11:
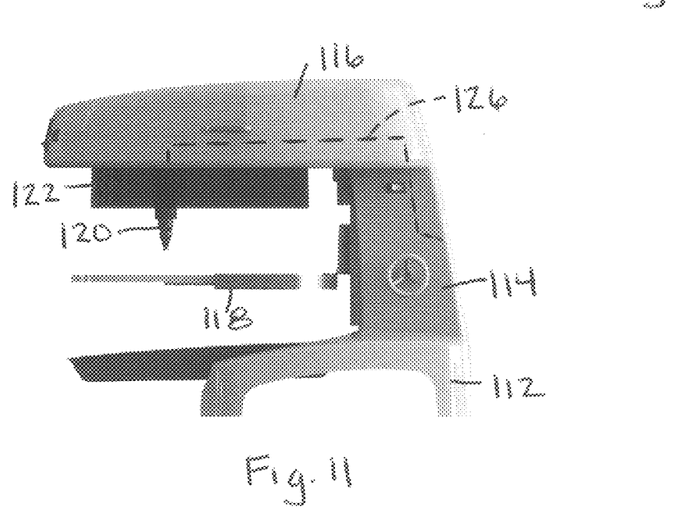

It is to be clearly understood that the above description is intended by way of illustration and example only, is not intended to be taken by way of limitation, and that other changes and modifications are possible. For example, an alternative embodiment of such a cutting apparatus 110, with base 112, pedestal 114, cantilevered head 116, workpiece support 118, plasma nozzle 120, shielding 122 and fixed couplers 124 is shown, with internal set of hose or tube and wiring 126. Other configurations are also possible.

The invention claimed is:

1. A plasma cutting apparatus, comprising:
   a housing comprising a base, an upright pedestal extending upward from the base and a stationary head cantilevered from the upright pedestal, wherein the stationary head extends in a fixed position over the base;
   a workpiece support extending from the upright pedestal and located below the stationary head and above the base;
   a movable plasma nozzle extending downward from an underside of the stationary head and oriented for delivering a cutting plasma generally along one direction and toward a workpiece on the workpiece support; and
   a nozzle drive arrangement mounted to the stationary head and connected for moving the plasma nozzle during a cutting operation, wherein the nozzle drive arrangement moves the plasma nozzle relative to the stationary head during cutting;
   wherein the nozzle drive arrangement is configured to move the plasma nozzle in a first direction along the underside of the stationary head, wherein the first direction is substantially perpendicular to the one direction;
   wherein the nozzle drive arrangement is configured to move the plasma nozzle in a second direction along the underside of the stationary head, wherein the second direction is substantially perpendicular to both the one direction and the first direction; and
   wherein the nozzle drive arrangement is configured to move the plasma nozzle in a third direction relative to the stationary head, wherein the third direction is substantially parallel to the one direction enabling variance and/or control of nozzle distance from the workpiece during cutting operations.

2. The plasma cutting apparatus of claim 1, wherein a height of the workpiece support along the pedestal is adjustable to vary a spacing between the workpiece support and the stationary head.

3. The plasma cutting apparatus of claim 1, further comprising a controller within the housing and connected to control the nozzle drive arrangement and plasma nozzle to control plasma nozzle movement and plasma nozzle firing according to a specified cut pattern to be made in a workpiece.

4. The plasma cutting apparatus of claim 3, wherein the controller comprises on-board non-transitory memory storing one or more cut patterns.

5. The plasma cutting apparatus of claim 4, further comprising a user interface on the housing, wherein the user interface is located at a front side of the stationary head.

6. The plasma cutting apparatus of claim 5, wherein the user interface includes selectable inputs for accessing locally-stored cut patterns.

7. The plasma cutting apparatus of claim 6, wherein the user interface includes selectable inputs for a circular hole cut pattern and a circular hole dimension.

8. The plasma cutting apparatus of claim 5, wherein the user interface includes selectable input for nozzle speed and/or selection of automatic nozzle speed adjustment.

9. The plasma cutting apparatus of claim 1, further including one or more data ports configured to receive custom cut pattern information from an external source.

10. The plasma cutting apparatus of claim 1, further including an alignment mechanism, wherein the alignment mechanism comprises at least one of (i) a laser pointer aimed along the plasma nozzle in the one direction, (ii) a projector configured for projecting an outline of an intended cut (iii) a camera positioned to view along the plasma nozzle in the one direction and a display for displaying an image viewed by the camera along with an overlay of an intended cut or (iv) a lens and mirror system configured to allow a user to operate the plasma cutting apparatus from a front side of the plasma cutting apparatus while viewing alignment marks built into the lens and mirror system.

11. The plasma cutting apparatus of claim 1, wherein an angle of the nozzle tip relative to the workpiece support is adjustable.

12. The plasma cutting apparatus of claim 1, wherein the workpiece support is grounded to a plasma supply ground path.

13. The cutting apparatus of claim 1, further including permanent, removable, or deflectable shielding located at the underside of the stationary head and around the plasma nozzle along at least the front side of the stationary head and left and right side portions of the stationary head to help optically shield a user's eyes.

14. The cutting apparatus of claim 1, further including a removable catch pan below the workpiece support.

15. The cutting apparatus of claim 1, wherein a projected rectangular footprint of the head is at least 70% of an area of the projected rectangular footprint of the base and no more than 130% of the area of the projected rectangular footprint of the base.

16. A plasma cutting apparatus, comprising:
- a housing comprising a base, an upright pedestal extending upward from the base and a stationary head cantilevered from the upright pedestal, wherein the stationary head extends in a fixed position over the base, the housing further comprising one or more fixed couplers for receiving plasma supply gas, plasma voltage, plasma grounding, and plasma system feedback;
- a movable nozzle body mounted on an underside of the stationary head for movement along the underside of the stationary head in at least a first direction and a second direction, where the second direction is substantially perpendicular to the first direction, the movable nozzle body including replaceable wear components;
- a network of hose and wiring for transmitting plasma supply gas and plasma voltage between the fixed couplers and the nozzle body, wherein the network of hose and wiring is enclosed within the housing and nozzle body and at least part of the network of hose and wiring is located within the stationary head.

17. The plasma cutting apparatus of claim 16 wherein the hose and wiring is completely enclosed within the housing and nozzle body.

\* \* \* \* \*